(12) United States Patent
Tanaka et al.

(10) Patent No.: US 11,556,750 B2
(45) Date of Patent: Jan. 17, 2023

(54) METHOD OF GENERATING COLOR SAMPLE DATA, METHOD OF PREPARING COLOR SAMPLE, AND COLOR SAMPLE PREPARATION DEVICE

(71) Applicant: SEIKO EPSON CORPORATION, Tokyo (JP)

(72) Inventors: Katsuyuki Tanaka, Nagano (JP); Takuya Ono, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/455,072

(22) Filed: Nov. 16, 2021

(65) Prior Publication Data

US 2022/0156537 A1 May 19, 2022

(30) Foreign Application Priority Data

Nov. 18, 2020 (JP) .............................. JP2020-191608

(51) Int. Cl.
*G06K 15/02* (2006.01)
*B41J 2/21* (2006.01)
*G06K 15/10* (2006.01)

(52) U.S. Cl.
CPC .......... *G06K 15/027* (2013.01); *B41J 2/2103* (2013.01); *G06K 15/102* (2013.01)

(58) Field of Classification Search
CPC .... G06K 15/027; G06K 15/102; B41J 2/2103
See application file for complete search history.

(56) References Cited

U.S. PATENT DOCUMENTS

| 2005/0237549 A1* | 10/2005 | Oh ........................ H04N 1/6033 |
| | | 358/1.9 |
| 2006/0139665 A1* | 6/2006 | Clark ...................... G01J 3/463 |
| | | 358/1.9 |
| 2019/0037111 A1 | 1/2019 | Ezoe | |

FOREIGN PATENT DOCUMENTS

| JP | 2006-129322 A | 5/2006 |
| JP | 2013-017111 A | 1/2013 |
| JP | 2019-029787 A | 2/2019 |
| JP | 2020-072280 A | 5/2020 |

\* cited by examiner

*Primary Examiner* — Quang N Vo
(74) *Attorney, Agent, or Firm* — Global IP Counselors, LLP

(57) ABSTRACT

The method of generating color sample data includes the step of generating the color sample data for preparing a color sample of a color included in a difference area between a color gamut in an equipment independent color space which is expressed by a first color expression apparatus and a color gamut in the equipment independent color space which is expressed by a second color expression apparatus using an output profile which expresses the color and corresponds to one of the first color expression apparatus and the second color expression apparatus configured to express a color in at least a part of the difference area out of a first output profile representing a correspondence relationship between a coordinate value in an output color space depending on the first color expression apparatus and a coordinate value in the equipment independent color space, and a second output profile representing a correspondence relationship between a coordinate value in an output color space depending on the second color expression apparatus and a coordinate value in the equipment independent color space based on a coordinate value in the difference area.

9 Claims, 11 Drawing Sheets

METHOD OF GENERATING COLOR SAMPLE DATA, METHOD OF PREPARING COLOR SAMPLE, AND COLOR SAMPLE PREPARATION DEVICE

The present application is based on, and claims priority from JP Application Serial Number 2020-191608, filed Nov. 18, 2020, the disclosure of which is hereby incorporated by reference herein in its entirety.

BACKGROUND

1. Technical Field

The present disclosure relates to a method of generating color sample data, a method of preparing a color sample, and a color sample preparation device.

2. Related Art

In color printing with a printer, and color display on a display, there is used a color sample or a color chart prepared in advance in order to match colors to be reproduced.

In JP-A-2013-17111 (Document 1), there is described a color chart preparation device for preparing a color chart consisting of a plurality of color patches. This color chart preparation device is characterized by including a representative color extraction unit for extracting a plurality of colors high in appearance frequency as representative colors from manuscript image data, a color patch color decision unit for deciding colors of color patches based on the representative colors, a color patch arrangement position decision unit for deciding positions at which the color patches on the color chart are to be arranged based on positions at which the representative colors appear in the manuscript image data, and a color patch arrangement unit for arranging the color patches of the colors thus decided at the positions thus decided on the color chart.

It is asserted that according to this color chart preparation device, by deciding the colors of the color patches constituting the color chart based on the colors high in appearance frequency in the manuscript image data, and at the same time, deciding the arrangement of the color patches based on the positions at which the colors appear in the manuscript image data, it is possible to effectively use the limited number of color patches, and at the same time, it is possible to optimize the arrangement of the color patches.

However, in the color chart preparation device described in Document 1, there is a problem that it is unachievable to easily obtain information such as whether or not a color gamut of the reproducible colors has changed or whether or not intended colors are reproducible when the color reproduction environment such as a printer or a display, or a color space of the color image data to be input has been changed.

SUMMARY

A method of generating color sample data according to the present disclosure includes: generating the color sample data for preparing a color sample of a color included in a difference area between a first color gamut in an equipment independent color space which is expressed by a first color expression apparatus and a second color gamut in the equipment independent color space which is expressed by a second color expression apparatus using an output profile which expresses the color and corresponds to one of the first color expression apparatus and the second color expression apparatus configured to express a color in at least a part of the difference area out of a first output profile representing a correspondence relationship between a coordinate value in an output color space depending on the first color expression apparatus and a coordinate value in the equipment independent color space, and a second output profile representing a correspondence relationship between a coordinate value in an output color space depending on the second color expression apparatus and a coordinate value in the equipment independent color space based on a coordinate value in the difference area.

A method of generating color sample data according to the present disclosure includes: generating the color sample data for preparing a color sample of a color included in a difference area between a first color gamut in an equipment independent color space corresponding to a first input image color space and a second color gamut in the equipment independent color space corresponding to a second input image color space using an output profile which expresses a color and represents a correspondence relationship between a coordinate value in an output color space depending on a color expression apparatus expressing a color in at least a part of the difference area and a coordinate value in the equipment independent color space based on a coordinate value in the difference area.

A method of preparing a color sample according to the present disclosure includes: generating the color sample data with the method of generating the color sample data described above, and preparing the color sample using the color sample data generated.

A color sample preparation device according to the present disclosure includes an image processing device configured to generate the color sample data with the method of generating the color sample data described above, and a printer configured to prepare the color sample using the color sample data generated.

DESCRIPTION OF EXEMPLARY EMBODIMENTS

1. Embodiment 1

Figure 1:
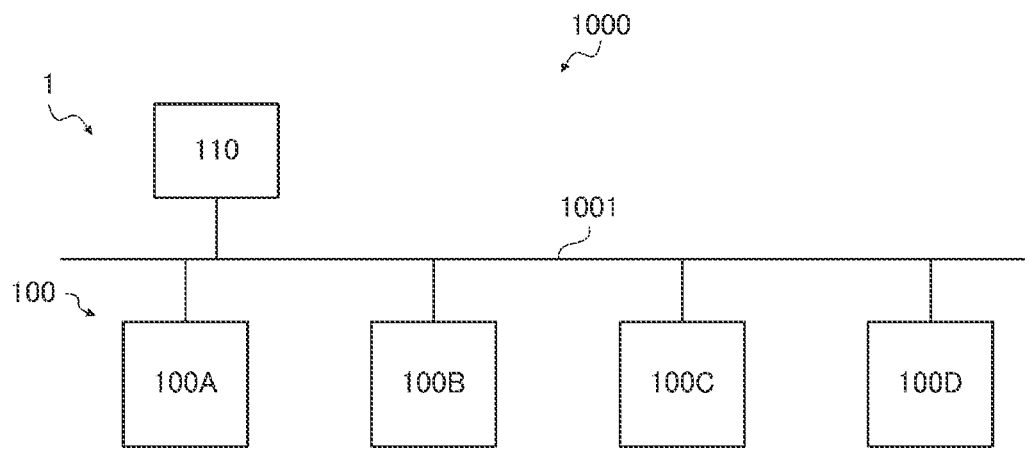
FIG. 1 is a block diagram of a print system including a color sample preparation device according to Embodiment 1.
Figure 2:
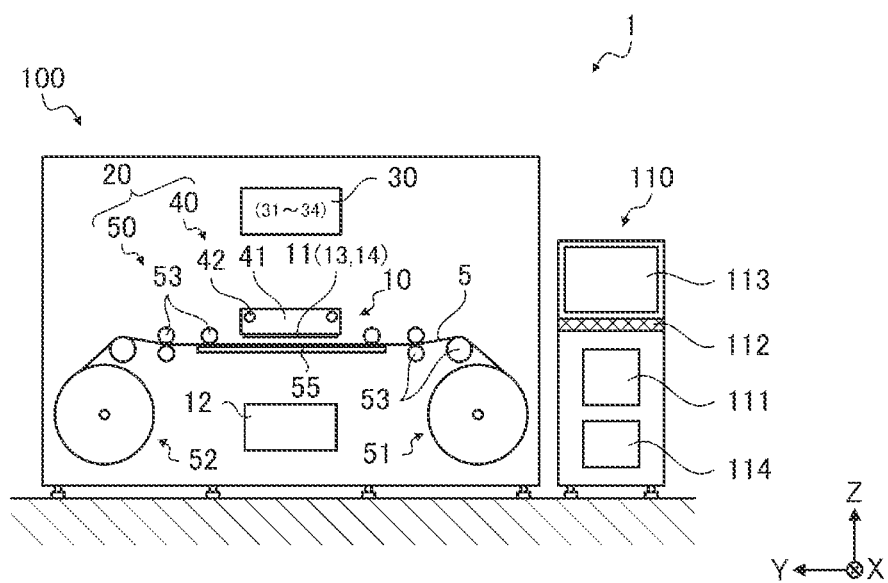
FIG. 2 is a schematic diagram showing a configuration of the color sample preparation device.
Figure 3:
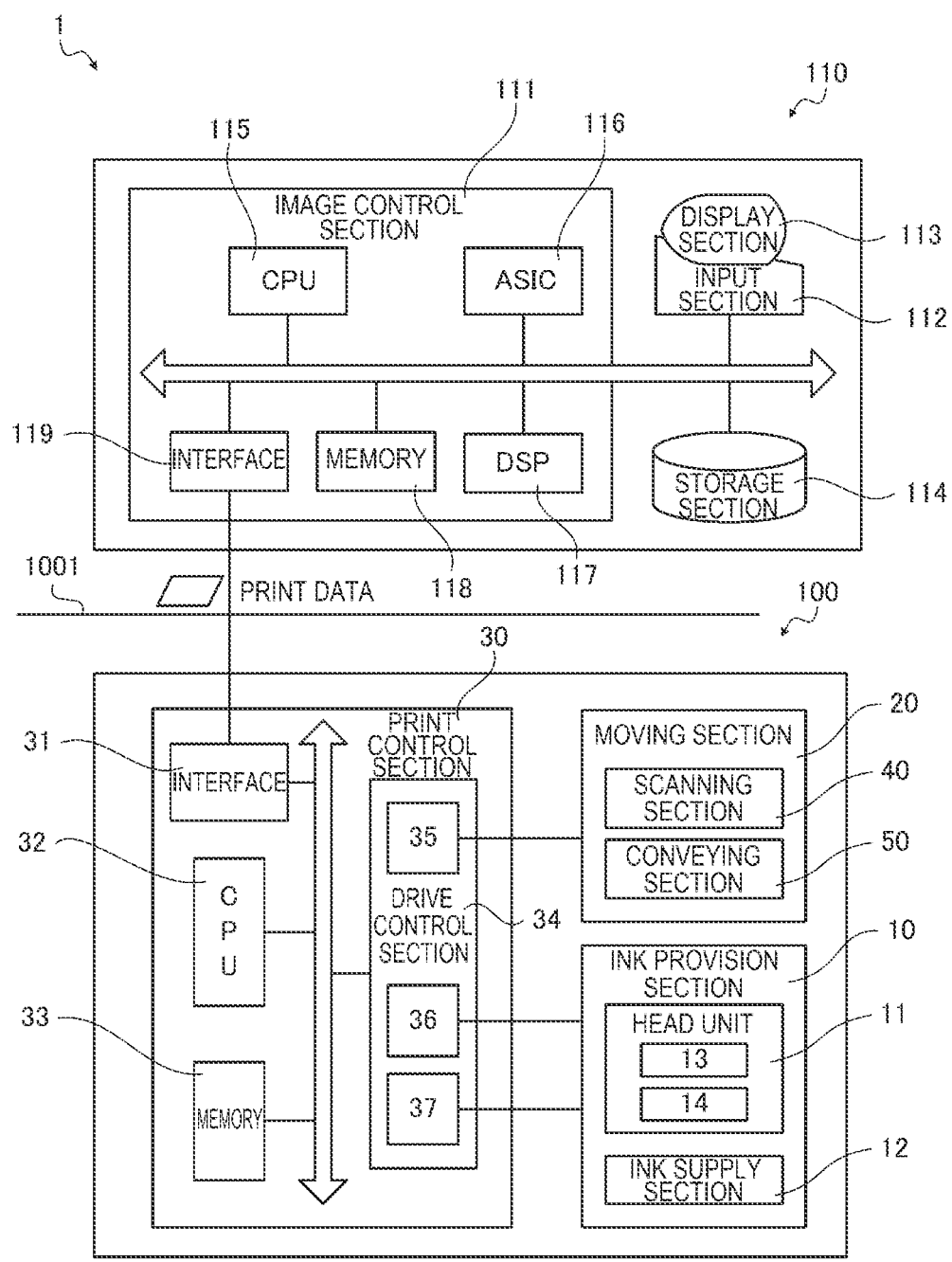
FIG. 3 is a block diagram showing a configuration of a color sample preparation device.

A basic configuration of a printing system 1000 including a color sample preparation device 1 according to Embodiment 1 will be described with reference to FIG. 1 through FIG. 3.

The printing system 1000 is constituted by a plurality of printers 100, an image processing device 110, and so on, wherein these constituents are coupled to each other via a network 1001 coupled with a multipurpose interface. In FIG. 1, as the plurality of printers 100, there are shown the printers 100A through 100D.

In the present embodiment, the color sample preparation device 1 is constituted by the image processing device 110 and one of the printers 100, or the image processing device 110 and the plurality of printers 100.

The printer 100 is an inkjet printer for providing ink to a print medium 5 having an elongated shape set in a rolled state to thereby print a desired image based on print data received from the image processing device 110. In other words, the printer 100 is a color expression apparatus which can perform color expression of colors in an input image color space such as RGB by color printing.

The plurality of printers 100 includes the printers 100 different in color reproduction range which can be expressed from each other. The color reproduction range of each of the printers 100 is different by, for example, a type of the ink installed, the number of ink colors, a method of halftoning, and an upper limit and a lower limit of an amount of the ink to be applied per form.

The image processing device 110 is a computer provided with an image control section 111, an input section 112, a display section 113, a storage section 114 and so on, and performs control of a print job of making the printer 100 perform printing. Further, the image processing device 110 generates the print data for making the printer 100 perform printing of a desired image based on the image data.

The software with which the image processing device 110 operates includes multipurpose image processing application software for handling the image data to be printed, and printer driver software for controlling the printer 100, and generating the print data for making the printer 100 perform printing. In the following description, the image processing application software is simply referred to as an image processing application, and the printer driver software is simply referred to as a printer driver.

Here, the image data means digital image information in an RGB space as the input image color space including, for example, text data and full-color image data.

A basic configuration of the image control section 111 will be described. The image control section 111 is provided with a CPU 115, an ASIC 116, a DSP 117, a memory 118, an interface 119, and so on, and performs central control of the whole of the color sample preparation device 1. CPU denotes Central Processing Unit, ASIC denotes Application Specific Integrated Circuit, and DSP denotes Digital Signal Processor.

The input section 112 is an information input unit as a user interface. Specifically, the input section 112 is, for example, a keyboard or a mouse pointer.

The display section 113 is an information display unit as a user interface, and displays information input from the input section 112, an image to be printed by the printer 100, information related to the print job, and so on under the control by the image control section 111.

The storage section 114 is a rewritable storage medium such as a hard disk drive or a memory card, and stores a program running in the image control section 111 as the software with which the image processing device 110 operates, an image to be printed, information related to the print job, and so on.

The memory 118 is a storage medium for keeping an area for storing the program with which the CPU 115 operates, a working area in which the CPU 115 operates, and so on, and is formed of a storage element such as a RAM or an EEPROM. RAM denotes Random Access Memory, and EEPROM denotes Electrically Erasable Programmable Read-Only Memory.

The interface 119 is, for example, a LAN interface, and is an interface capable of performing bidirectional communication with external electronic equipment. LAN denotes Local Area Network.

A basic configuration common to the plurality of printers 100 will be described. The printer 100 is constituted by an ink provision section 10, a moving section 20, a print control section 30, and so on. The printer 100 having received the print data from the image processing device 110 controls the ink provision section 10 and the moving section 20 with the print control section 30 based on the print data to print an image on the print medium 5.

The print data is data for image formation obtained by performing a conversion process on the image data with the image processing application and the printer driver provided to the image processing device 110 so as to be able to be printed by the printer 100, and includes a command for controlling the printer 100.

The ink provision section 10 is constituted by a head unit 11, an ink supply section 12, and so on.

The moving section 20 is constituted by a scanning section 40, a conveying section 50, and so on.

The scanning section 40 is constituted by a carriage 41, a guide shaft 42, a carriage motor, and so on. The carriage motor is omitted from the illustration.

The conveying section 50 is constituted by a supply section 51, a housing section 52, conveying rollers 53, a platen 55, and so on.

The head unit 11 is provided with a head 13 provided with a plurality of nozzles for ejecting the ink for printing as an ink droplet, and a head control section 14. The head unit 11 is mounted on the carriage 41, in other words, the head 13 is mounted on the carriage 41, and the head unit 11 reciprocates in the X-axis direction together with the carriage 41 moving in the X-axis direction as a scanning direction.

As the ink, there is used a four-color ink set having black ink in addition to an ink set of three colors of cyan, magenta, and yellow, an eight color ink set having an ink set of light cyan, light magenta, light yellow, and light black in addition thereto, or a set having fluorescent ink in addition thereto.

The ink supply section 12 is provided with an ink tank, an ink supply path for supplying the ink from the ink tank to the head 13, and so on. The ink tank and the ink supply path will be omitted from the illustration.

The ink tank, the ink supply path, and an ink supply channel to the nozzles for ejecting the same ink are independently disposed for each ink.

The moving section 20, namely the scanning section 40 and the conveying section 50, moves the print medium 5 relatively to the head 13 under the control by the print control section 30.

The guide shaft 42 extends in the X-axis direction to support the carriage 41 in a slidable state. Further, the carriage motor forms a drive source when reciprocating the carriage 41 along the guide shaft 42. In other words, the scanning section 40 moves the carriage 41, namely the head 13, in the X-axis direction along the guide shaft 42 under the control by the print control section 30. By the head 13 provided to the head unit 11 mounted on the carriage 41 ejecting ink droplets on the print medium 5 supported by the platen 55 under the control by the print control section 30 while moving in the X-axis direction, a plurality of dot columns along the X-axis direction is formed on the print medium 5.

The supply section 51 rotatably supports a reel having the print medium 5 rolled to have a roll shape, and feeds the print medium 5 to a conveying route. The housing section 52 rotatably supports the reel for winding the print medium 5, and winds the print medium 5 printing on which has been completed from the conveying route.

The conveying rollers 53 consist of drive rollers for moving the print medium 5, driven rollers rotating in accordance with the movement of the print medium 5, and so on, and move the print medium 5 in the Y-axis direction as a conveying direction crossing the scanning direction on an upper surface of the platen 55. The conveying rollers 53 form the conveying route for conveying the print medium 5 from the supply section 51 to the housing section 52 through a print area of the ink provision section 10. The print area is an area where the head 13 moves in the X-axis direction on the upper surface of the platen 55.

The platen 55 is a flat plate which extends in the X-Y plane direction to support the print medium 5 from below in the print area.

The print control section 30 is provided with an interface 31, a CPU 32, a memory 33, a drive control section 34, and so on, and performs control of the printer 100.

The interface 31 is coupled to an interface 119 of the image processing device 110 to perform transmission and reception of data between the image processing device 110 and the printer 100.

The CPU 32 is an arithmetic processing device for performing overall control of the printer 100.

The memory 33 is a storage medium for keeping an area for storing the program with which the CPU 32 operates, a working area in which the CPU 32 operates, and so on, and is formed of a storage element such as a RAM or an EEPROM.

The CPU 32 controls the ink provision section 10 and the moving section 20 via the drive control section 34 in accordance with the program stored in the memory 33 and the print data received from the image processing device 110.

The drive control section 34 includes firmware operating based on the control by the CPU 32 to control the drive of the head unit 11 and the ink supply section 12 of the ink provision section 10, and the scanning section 40 and the conveying section 50 of the moving section 20. The drive control section 34 is constituted by drive control circuits including a movement control signal generation circuit 35, an ejection control signal generation circuit 36, a drive signal generation circuit 37, and so on, a ROM or a flash memory incorporating the firmware for controlling these drive control circuits, and so on. The ROM or the flash memory incorporating the firmware for controlling the drive control circuits will be omitted from the illustration. Here, ROM denotes Read-Only Memory.

The movement control signal generation circuit 35 is a circuit for generating a signal for controlling the scanning section 40 and the conveying section 50 of the moving section 20 in accordance with an instruction from the CPU 32 based on the print data.

The ejection control signal generation circuit 36 is a circuit for generating a head control signal for performing selection of the nozzle for ejecting the ink, selection of the amount to be ejected, control of the timing of the ejection, and so on in accordance with an instruction from the CPU 32 based on the print data.

The drive signal generation circuit 37 is a circuit for generating a drive signal for driving the pressure generation chamber provided to the head 13.

Due to the configuration described above, by repeating an operation of ejecting the ink droplets from the head 13 to the print medium 5 supplied to the print area by the supply section 51 and the conveying rollers 53 while moving the carriage 41 supporting the head 13 in the X-axis direction along the guide shaft 42, and an operation of moving the print medium 5 in the +Y direction crossing the X-axis direction using the conveying rollers 53, the print control section 30 prints a desired image on the print medium 5.

Printing on the print medium 5 is started by transmission of the print data from the image processing device 110 to the printer 100. The print data is generated by the printer driver.

Figure 4:
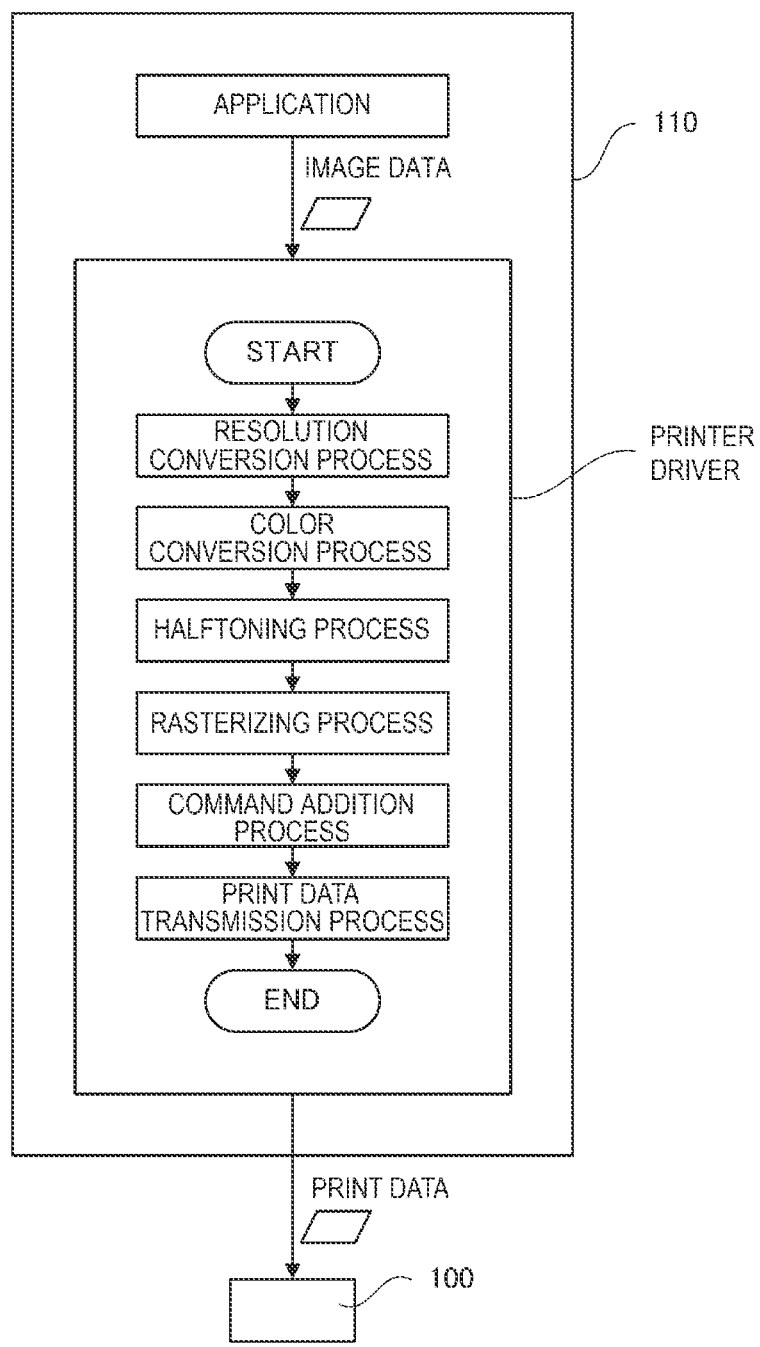
FIG. 4 is an explanatory diagram of a basic function of a printer driver.

A generation process of the print data performed by the printer driver will hereinafter be described with reference to FIG. 4.

The printer driver receives the image data from the image processing application, converts the image data into the print data in a format which can be interpreted by the printer 100, and then outputs the print data to the printer 100. When converting the image data from the image processing application into the print data, the printer driver performs a resolution conversion process, a color conversion process, a halftoning process, a rasterizing process, a command addition process, and so on.

The resolution conversion process is a process of converting the resolution of the image data output from the image processing application into the resolution when recording the image data on the recording medium 5. For example, when the resolution when performing printing is designated to 720×720 dpi, the image data in a vector format received from the image processing application is converted into the image data in a bitmap format having the resolution of 720×720 dpi. Pixel data of the image data on which the resolution conversion process has been performed is constituted by pixels arranged in a matrix. Each of the pixels has a grayscale value of, for example, 256 gray levels in the RGB color space. In other words, the pixel data on which the resolution conversion has been performed represents the grayscale values of the corresponding pixels. Hereinafter, the grayscale value data in the RGB color space is referred to as RGB data.

The pixel data corresponding to the pixels arranged in a predetermined direction forming a column out of the pixels arranged in a matrix is referred to as raster data. It should be noted that the predetermined direction in which the pixels corresponding to the raster data are arranged corresponds to a movement direction of the head 13 when printing the image, specifically the X-axis direction. The movement direction of the head 13 is, in other words, a relative movement direction in which the head 13 and the print medium 5 move relatively to each other.

The color conversion process is a process of converting the RGB data as the image data into grayscale value data in a CMYK color space. The CMYK color denotes cyan, magenta, yellow, and black, and the image data in the CMYK color space is data corresponding to the colors of the ink provided to the printer 100. Therefore, for example, when the printer 100 uses 4 types of ink in the CMYK color system, the printer driver generates the image data in the four-dimensional space in the CMYK color system based on the RGB data. The grayscale value data in the CMYK color space is, in other words, ink amount data. Hereinafter, the grayscale value data in the CMYK color space is referred to as CMYK data.

The color conversion process is performed based on a color conversion look-up table having the grayscale values of the RGB data and the grayscale values of the CMYK data corresponding to each other. It should be noted that the pixel data on which the color conversion process has been performed is the CMYK data of, for example, 256 gray levels represented by the CMYK color space.

The halftoning process is processing of converting the data of a large number of gray levels such as data of 256 gray levels into data of a number of gray levels which can be formed by the printer 100. Due to the halftoning process, the data representing the 256 gray levels is converted into halftone data of one bit representing 2 gray levels of presence of a dot and absence of the dot, or halftone data of two bits representing 4 gray levels of no dot, a small dot, a middle dot, and a large dot. Specifically, a formation rate of a dot corresponding to a grayscale value is obtained from a dot formation rate table having the grayscale values of 0 through 255 and the dot formation rate corresponding to each other. Regarding the formation rate of the dot obtained corresponding to the grayscale value, in the case of the 4 gray levels, for example, the formation rate of each of no dot, a small dot, a middle dot, and a large dot is obtained. In each of the formation rates thus obtained, the pixel data is formed so that the dots are formed in a dispersed manner using a dither method, an error diffusion method, and so on.

The rasterizing process is processing of sorting the pixel data of 1-bit or 2-bit described above arranged in a matrix in accordance with the dot formation order when performing printing. The rasterizing process includes a path assigning process of assigning the image data constituted by the pixel data on which the halftoning process has been performed to the passes in which the head ejects the ink droplets while moving. When the path assignment is completed, the actual nozzles for forming the raster lines constituting a print image are assigned. Here, the print image means an image printed on the print medium 5, or an image of a picture printed on the print medium 5.

The command addition process is processing of adding command data corresponding to the printing method to the data on which the rasterizing process has been performed. As the command data, there is cited, for example, conveying data related to a conveying specification of the print medium 5. The conveying specification means, for example, movement amount and a speed toward the conveying direction of the print medium 5 on the upper surface of the platen 55.

A series of processes described above by the printer driver are performed by the ASIC 116 and the DSP 117 under the control by the CPU 115, and in the print data transmission process, the print data generated in the series of processes is transmitted to the printer 100 via the interface 119.

Then, the color conversion process will be described with reference to FIG. 5.

Figure 5:
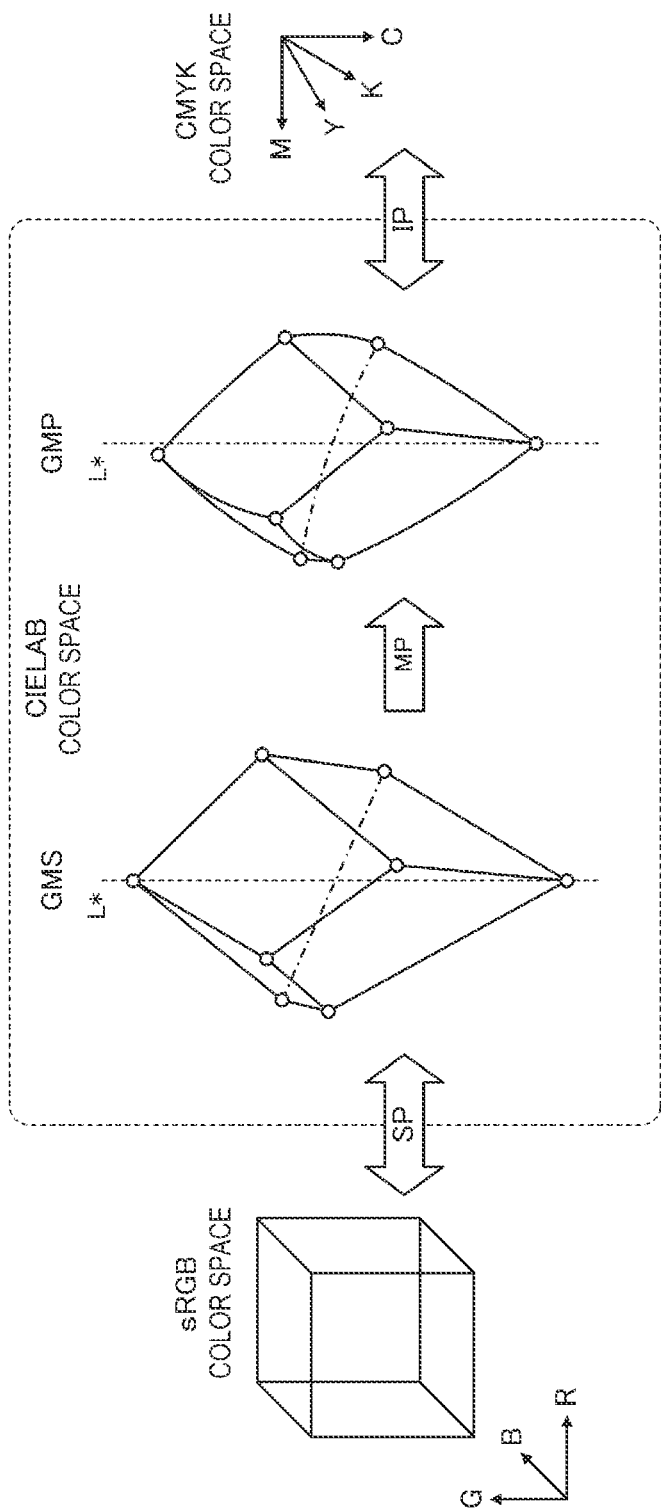
FIG. 5 is a conceptual diagram showing a relationship between color spaces in color conversion processing.

Here, as shown in FIG. 5, as an example of the processing of converting the RGB data as the image data in the input image color space into the CMYK data for performing printing, there will be described the processing of converting sRGB data as one of the typical RGB standards into the CMYK data in the CMYK color space as a space of ink amount data via the CIELAB color space as a profile connection space. The CIELAB color space is CIE 1976 (L*a*b*) color space, and is an equipment independent color space in the present embodiment. CIE denotes International Commission on Illumination (Commission internationale de l'eclairage).

The color conversion look-up table is a look-up table for making the grayscale values of the sRGB data and the grayscale values of the CMYK data correspond to each other, and is formed of a source profile SP, a mapping table MP, and an ink amount profile IP in advance.

The source profile is a look-up table formed of an attribute of the input image color space in advance, and the source profile SP shown here is an A2B look-up table which defines a correspondence relationship between the coordinate value in the sRGB color space and an L*a*b* value as the coordinate value in the CIELAB color space. The color gamut corresponding to the sRGB color space, namely the color gamut in which the sRGB color space can be reproduced, is made to correspond to a source gamut GMS represented by a L*a*b* value by the source profile SP. It should be noted that in the present embodiment, "A to B" is described as A2B, and "B to A" is described as B2A.

The coordinate in the sRGB color space is represented by, for example, the grayscale value as an integer in a range of 0 through 255. The source profile SP is only required to define the correspondence relationship between the coordinate in the sRGB color space and the L*a*b* value in the CIELAB color space, and can be provided by a conversion equation.

The ink amount profile IP is the A2B look-up table which defines the correspondence relationship between the coordinate value of the CMYK color space of the printer 100 and the L*a*b* value in the CIELAB color space, and is prepared in advance in accordance with the specification of the printer 100. The CMYK color space is a color space which can be reproduced by being expressed with the ink used by the printer 100, and the coordinate in the CMYK color space represents a combination of amounts of the ink of CMYK. The coordinate in the CMYK color space is represented by, for example, the grayscale value as an integer in a range of 0 through 255. By designating the coordinate in the CMYK color space to the printer 100, the printer 100 reproduces an ink coverage factor corresponding to the ink amounts corresponding to the coordinate on the print medium 5. In reality, as described above, regarding the coordinate data in the CMYK color space, the print data is generated by the processing in the halftoning process and subsequent processes, and the printer 100 is driven in accordance with the print data. By the printer 100 reproducing the ink coverage factor based on the coordinate in the CMYK color space on the print medium 5, the color of the L*a*b* value corresponding to the coordinate in the CMYK color space is reproduced. The color gamut which can be expressed by the printer 100 is limited in accordance with the specification of the printer 100 or the ink used by the printer 100, and is made to correspond to a printer gamut GMP represented by the L*a*b* value using the ink amount profile IP.

In the example shown in FIG. 5, the source gamut GMS and the printer gamut GMP are different in size in the CIELAB color space, and the printer gamut GMP is made smaller than the source gamut GMS. In other words, in the case of this example, the color gamut which can be reproduced by the printer 100 becomes a small color gamut than the color gamut which the image data can have in the input image color space. Therefore, mapping for making a coordinate of each of grid points in the source gamut GMS correspond to a coordinate of each of grid points in the printer gamut GMP is performed. A table for making the coordinates of the grid points correspond to each other is the mapping table MP.

The mapping table MP is prepared as a table for making the source profile SP and the ink amount profile IP correspond to each other.

The B2A look-up table for converting a coordinate value in the source gamut GMS into a coordinate value in the CMYK color space of the printer 100 is constituted by the mapping table MP and the ink amount profile IP.

It should be noted that the detailed description of the source gamut GMS and the printer gamut GMP, and the method of preparing the mapping table MP will be omitted.

In the color conversion process, the RGB data as the image data is converted into the grayscale value data in the CMYK color space using the color conversion look-up table. Specifically, in the example shown in FIG. 5, as described above, the coordinate value in the sRGB color space is converted into the grayscale value data in the CMYK color space using the color conversion look-up table obtained by the A2B look-up table which defines the correspondence relationship between the coordinate value in the sRGB color space and the L*a*b* value as the coordinate value in the CIELAB color space, namely the source profile SP, and the B2A look-up table in which the coordinate value of the source gamut GMS is converted into the coordinate value in the CMYK color space of the printer 100.

In the present embodiment, the input profile includes the A2B look-up table representing the correspondence relationship between the coordinate value in the input image color space and the coordinate value in the equipment independent color space. Further, in the present embodiment, the output profile includes the A2B look-up table and the B2A look-up table representing the correspondence relationship between the coordinate value in the output color space depending on the color expression apparatus and the coordinate value in the equipment independent color space.

In other words, in the case of the example shown in FIG. 5, the input profile includes the source profile SP as the A2B look-up table, and the output profile includes the ink amount profile IP as the A2B look-up table, and the mapping table MP and the ink amount profile IP as the B2A look-up table.

Incidentally, as described above, the color reproduction range in which the printer 100 can express the colors is different by the specification of the printer 100 in some cases, and the B2A look-up table in which the coordinate value of the source gamut GMS is converted into the coordinate value in the CMYK color space of the printer 100 becomes different depending on the specification of the printer 100. Therefore, in order to match the colors to be reproduced between the printers 100 different from each other, and in order to judge whether or not printing with the desired colors by the printer 100 to be used can be performed, a color chart or a color sample printed by each of the printers 100 to display the color gamut which can be expressed by the printers 100 becomes useful.

The printing system 1000 according to the present embodiment is characterized in a method of generating color sample data for preparing the color sample from a viewpoint of including the color sample preparation device 1 constituted by the image processing device 110 and the printer 100. Specifically, in the method of generating the color sample data according to the present embodiment, there are generated the color sample data for providing the color sample with which the color expression area different by the printer 100, namely an area of a difference between the color reproduction ranges in which the colors can be expressed, can easily be figured out.

The color sample data is generated by the image processing device 110 as the print data for printing the color sample, and is prepared by the image processing device 110 transmitting the print data to the printer 100 corresponding to the color sample, and the printer 100 printing the print data.

Figure 6:
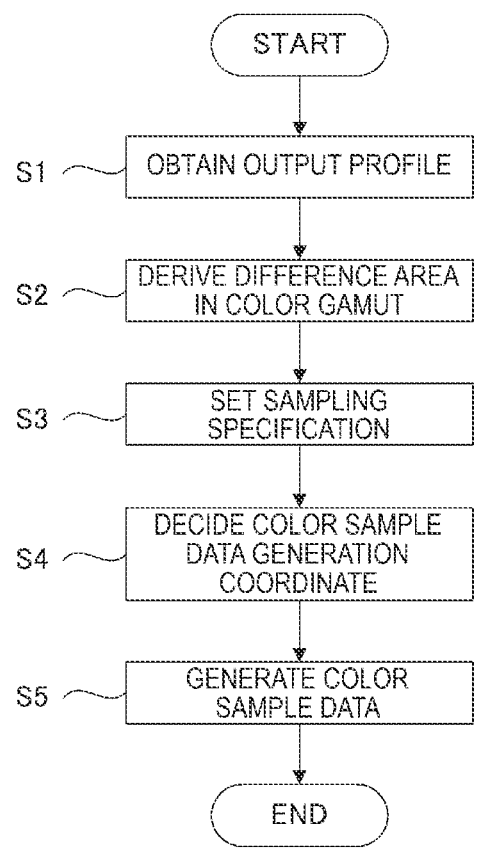
FIG. 6 is a flowchart showing a method of generating color sample data according to Embodiment 1.
Figure 10:
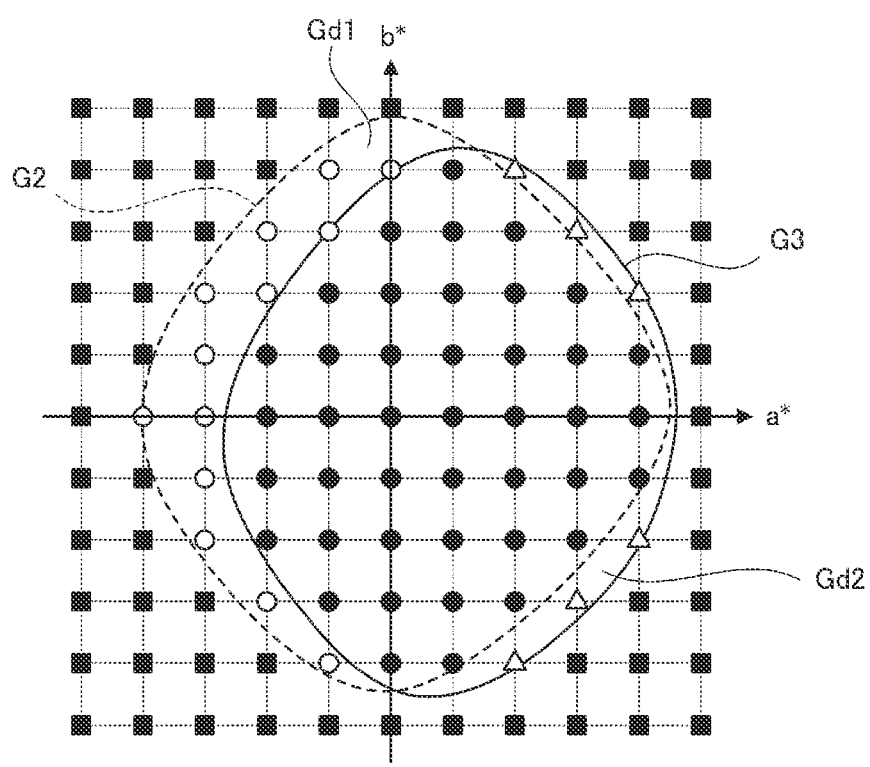
FIG. 10 is a coordinate conceptual diagram showing another example of a difference area in color gamut in the CIELAB color space.

The method of generating the color sample data according to the present embodiment will be described with reference to the flowchart shown in FIG. 6, and coordinate conceptual diagrams of the CIELAB color space shown in FIG. through FIG. 10, defining a first color expression apparatus as the printer 100A shown in FIG. 1, a second color expression apparatus as the printer 100B, and focusing attention on the printer 100A and the printer 100B.

Generation of the color sample data is performed as a function of the color sample data generation program operating in the image processing device 110.

It should be noted that the description will be presented assuming the equipment independent color space as the CIELAB color space, and the output color space depending on the color expression apparatus as the CMYK color space as shown in FIG. 5.

Further, a first output profile representing a correspondence relationship between the coordinate value in the output color space depending on the first color expression apparatus and the coordinate value in the equipment independent color space, namely the first output profile representing a correspondence relationship between the coordinate value in the CMYK color space depending on the printer 100A and the coordinate value in the CIELAB color space, is defined as an output profile O1, and a second output profile representing a correspondence relationship between the coordinate value in the output color space depending on the second color expression apparatus and the coordinate value in the equipment independent color space, namely the second output profile representing a correspondence relationship between the coordinate value in the CMYK color space depending on the printer 100B and the coordinate value in the CIELAB color space, is defined as an output profile O2.

Further, an area of a difference in color reproduction range in which the printer 100 can express the colors in the CIELAB color space is referred to as a difference area, and a first color gamut in the equipment independent color space which can be expressed by the first color expression apparatus, namely a color gamut in the CIELAB color space which can be expressed by the printer 100A, is defined as a color gamut G1, a second color gamut in the equipment independent color space which can be expressed by the second color expression apparatus, namely a color gamut in the CIELAB color space which can be expressed by the printer 100B, is defined as a color gamut G2, and an area of the difference between the color gamut G1 and the color gamut G2 is defined as a difference area Gd.

First, as the step S1, the output profile O1 and the output profile O2 are obtained. The step S1 is an output profile acquisition step in the present embodiment.

The output profile O1 and the output profile O2 can be obtained in advance, and for example, all of the output profiles of the printers 100 included in the printing system 1000 are stored in advance in the storage section 114 provided to the image processing device 110. In the step S1, in order to obtain the difference area Gd between the printer 100A and the printer 100B, the output profile O1 and the output profile O2 stored in the storage section 114 are retrieved.

Then, as the step S2, the color gamut G1 is obtained by the output profile O1, the color gamut G2 is obtained by the output profile O2, and the difference area Gd is obtained based on the color gamut G1 and the color gamut G2 thus obtained. The step S2 is a difference area derivation step in the present embodiment.

In the step S2, specifically, the coordinate values included in the color gamut G1 and the color gamut G2 are recognized as the coordinate values on the common coordinate axis in the CIELAB color space, and then, the coordinates included in the difference area Gd are obtained based on the respective coordinate values thus recognized.

Figure 7:
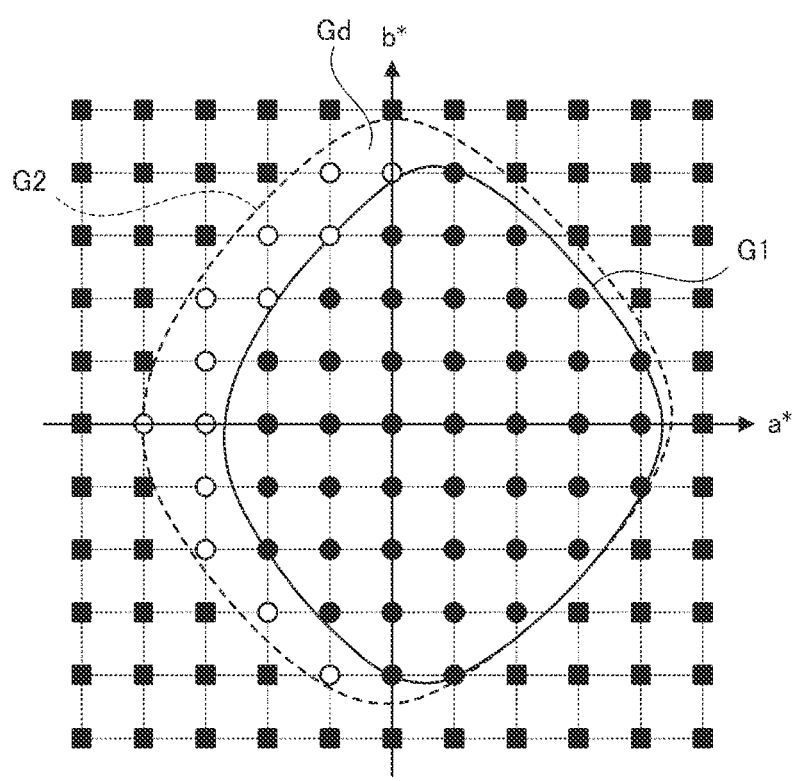
FIG. 7 is a coordinate conceptual diagram showing a relationship in color gamut in the CIELAB color space.

FIG. 7 shows an a*b* plane at a certain lightness L* in the CIELAB color space, the area surrounded by a solid line represents the color gamut G1, and the area surrounded by a dotted line represents the color gamut G2. Further, the coordinates represented by the filled circles each represent the coordinate included in the color gamut G1, the coordinates represented by the filled quadrangles each represent the coordinate included in neither the color gamut G1 nor the color gamut G2, and the coordinates represented by the open circles each represent the coordinate included in the difference area Gd between the color gamut G1 and the color gamut G2. It should be noted that FIG. 7 shows an example of when the color gamut G1 is included inside the color gamut G2.

Then, as the step S3, there is set a sampling specification of the coordinate in the difference area Gd to be a target for the generation of the color sample data. The step S3 is a sampling specification setting step in the present embodiment.

The sampling specification means a specification for designating the colors to be a target to be extracted and prepared as the color sample out of the colors included in the difference area Gd. In other words, the coordinate values to be the target for the generation of the color sample data are extracted or set as new coordinate values based on the sampling specification set in the sampling specification setting step.

Specifically, as the sampling specification, for example, it is arranged that a predetermined color difference in the CIELAB color space is set, and the coordinates for generating the color sample data are picked up every predetermined color difference from all of the coordinates included in the difference area Gd.

Alternatively, as the sampling specification, it is also possible to perform, for example, setting of increasing the sampling frequency, namely setting of preparing a larger number of samples than the number of coordinates recognized. Specifically, new coordinates corresponding to midpoints between the coordinates recognized in the difference area Gd, namely midpoints between the grid points, centroids of hexahedrons each having eight grid points adjacent to each other as the vertexes, and so on can be added as the coordinates to be the target for the generation of the color sample data.

Further, alternatively, it is possible to arrange that the midpoints, the centroids, and so on are recognized as the new coordinates, and then the sampling is performed every predetermined color difference from the new coordinates.

Figure 8:
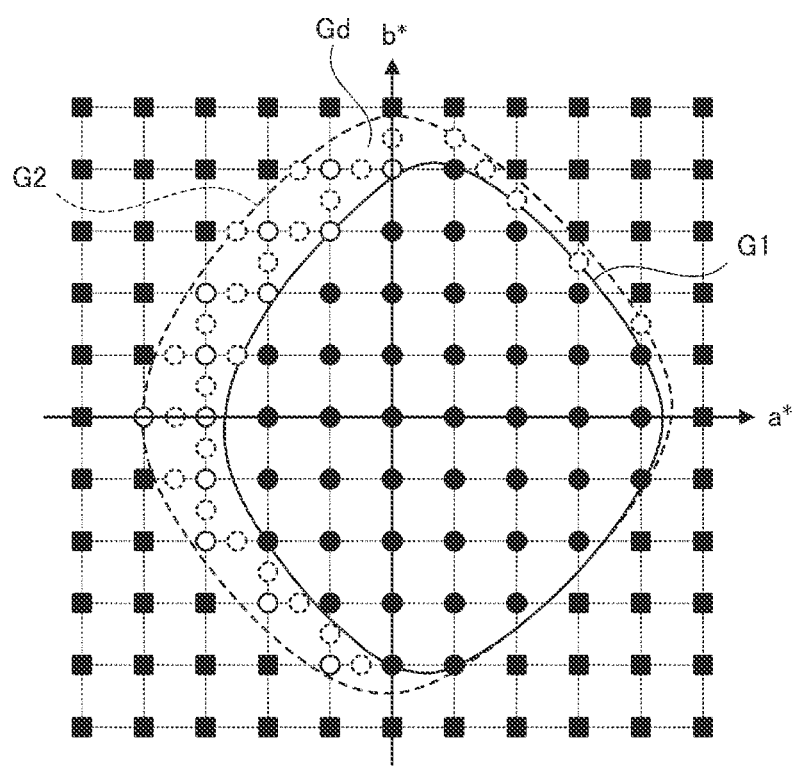
FIG. 8 is a coordinate conceptual diagram for explaining an aspect of a sampling specification.

FIG. 8 shows the condition in which the midpoints between the coordinates recognized in the difference area Gd are each represented by a dotted open circle, and are newly added as the coordinates to be the target for the generation of the color sample data.

Alternatively, as the sampling specification, for example, it is arranged that a predetermined color difference in the CIELAB color space is set, and the coordinates located at a distance no shorter than the predetermined color difference from an outer edge of the color gamut G1 are used as the coordinates to be the target for the generation of the color sample data.

Figure 9:
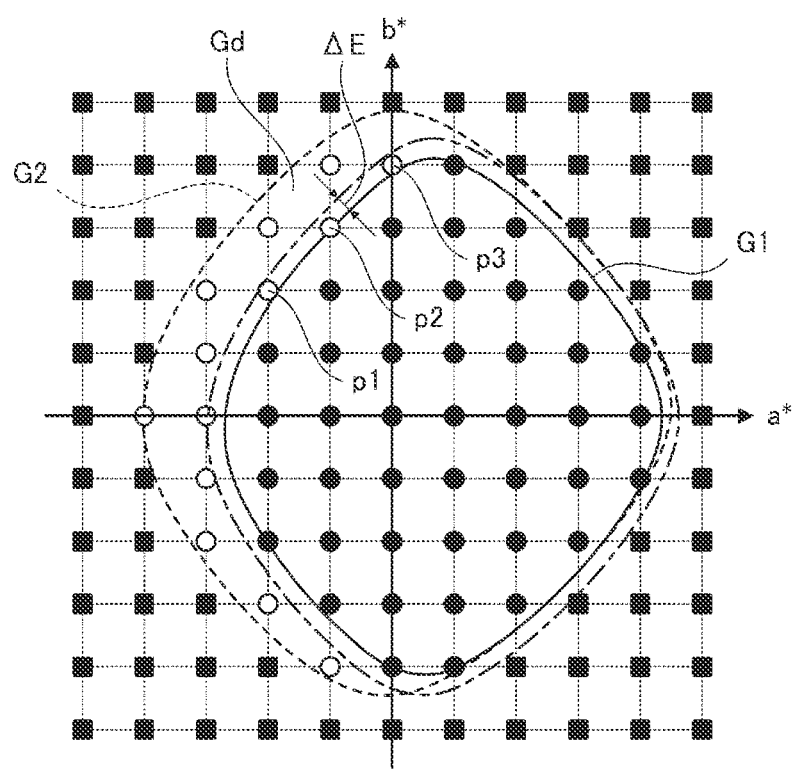
FIG. 9 is a coordinate conceptual diagram for explaining an aspect of a sampling specification.

FIG. 9 shows this example. The predetermined color difference ΔE is set, the coordinates located at a distance no shorter than the color difference ΔE from the outer edge of the color gamut G1, more specifically, the coordinates each having the shortest distance from the coordinate in the common area to the color gamut G1 and the color gamut G2 which is longer than the color difference ΔE, out of the coordinates in the difference area Gd are used as the coordinates of the color sample data to be the target for the generation in the color sample data generation step. FIG. 9 shows the fact that coordinates p1 through p3 included in an internal area located at a distance shorter than the color difference ΔE from the outer edge of the color gamut G1 are excluded from the target.

As the predetermined color difference ΔE, it is possible to use a numerical value such as ΔE76 expressed by the CIE76 color difference formula, or ΔE00 expressed by the CIE2000 color difference formula.

Alternatively, as the sampling specification, it is possible to designate attribute information of the existing color sample, and the coordinates which the color sample included in the existing color sample group is based on out of the coordinates in the difference area Gd are used as the coordinates of the color sample data to be the target for the generation in the color sample data generation step.

The attribute information of the existing color sample means information with which the existing color sample such as a color chart of PANTONE (a registered trademark) or a color chart of DIC (a registered trademark) is identified.

Then, as the step S4, the coordinates to be the target for the generation of the color sample data are derived and then decided based on the sampling specification set in the step S3. The step S4 is a color sample coordinate derivation step in the present embodiment.

For example, in the sampling specification setting step in the step S3, when setting a value of the predetermined color difference ΔE76, and setting the coordinates having the shortest distance from the coordinate in the common area to the color gamut G1 and the color gamut G2 which is no shorter than the value of the color difference ΔE76 out of the coordinates in the difference area Gd as the coordinates of the color sample data to be the target for the generation in the color sample data generation step, the corresponding coordinates are derived and then decided as the coordinates to be the target for the generation of the color sample data from the coordinates recognized inside the difference area Gd.

Further, for example, in the sampling specification setting step in the step S3, when setting the generation of the color sample data based on the color chart of PANTONE, in the color sample coordinate derivation step, the coordinates corresponding to the color chart of PANTONE included in the difference area Gd are used as the coordinates of the color sample data to be the target for the generation in the color sample data generation step.

Then, as the step S5, the color sample data corresponding to the coordinates to be the target for the generation of the color sample data decided in the step S4 is generated. The step S5 is a color sample data generation step in the present embodiment.

In the step S5, specifically, the color sample data as the print data on which the color conversion has been performed is generated using the output profile of the printer 100 which can express the colors at the target coordinates based on the coordinate values of the target coordinates for the generation of the color sample data in the difference area Gd.

The print data generated here includes a command for forming the plurality of color samples corresponding respectively to the plurality of coordinates to be the target in the difference area Gd, namely the color chart having a plurality of color patches arranged.

It should be noted that the difference area of the color gamut in which the colors can be expressed between the two printers 100 is not limited to the difference area Gd when the color gamut G2 which can be expressed by one of the printers 100 includes the color gamut G1 which can be expressed by the other of the printers 100 as shown in FIG. 7. For example, in some cases, a color gamut G3 which can be expressed by the other of the printers 100 is shifted from the color gamut G2 which can be expressed by the one of the printers 100 as shown in FIG. 10. Specifically, as the difference area, there are created a difference area Gd1 which can be expressed by one of the printers 100, but cannot be expressed by the other of the printers 100, and a difference area Gd2 which can be expressed by the other of the printers 100, but cannot be expressed by the one of the printers 100 in some cases.

In such a case, regarding the color sample data corresponding to the coordinates represented by the open circles included in the difference area Gd1, the color sample data as the print data on which the color conversion has been performed is generated using the output profile corresponding to the one of the printers 100 which can express the colors. Further, regarding the color sample data corresponding to the coordinates represented by the open triangles included in the difference area Gd2, the color sample data as the print data on which the color conversion has been performed is generated using the output profile corresponding to the other of the printers 100 which can express the colors.

As described above, in either case, in the step S5, the color sample data of the printer 100 capable of expressing the colors in the difference area is generated using the output profile of the printer 100 which can express the colors at the target coordinates based on the coordinate values of the target coordinates for the generation of the color sample data in the difference area.

As described above, in the method of generating the color sample data according to the present embodiment, the color sample data for preparing the color samples of the colors included in the difference area Gd is generated using the output profile capable of expressing the colors corresponding to one of the printer 100A and the printer 100B which can express the colors in at least a part of the difference area Gd out of the output profile O1 representing the correspondence relationship between the coordinate values in the CMYK color space depending on the printer 100A and the coordinate values in the CIELAB color space and the output profile O2 representing the correspondence relationship between the coordinate values in the CMYK color space depending on the printer 100B and the coordinate values in the CIELAB color space based on the coordinate values in the difference area Gd between the color gamut G1 in the CIELAB color space which can be expressed by the printer 100A and the color gamut G2 in the CIELAB color space which can be expressed by the printer 100B.

When printing the color samples, the image processing device 110 generates the color sample data as the print data based on the method of generating the color sample data described above, and then transmits the color sample data thus generated to the printer 100 capable of expressing the colors of the color samples. The printer 100 which has received the color sample data as the print data performs printing based on the color sample data.

Further, the method of preparing the color sample according to the present embodiment includes a step of generating the color sample data using the method of generating the color sample data described above, and a step of preparing the color sample using the color sample data thus generated.

According to the present embodiment, the following advantages can be obtained.

In the method of generating the color sample data according to the present embodiment, the color sample data for preparing the color samples of the colors included in the difference area Gd is generated using the output profile corresponding to one of the printer 100A and the printer 100B which can express the colors in at least a part of the difference area Gd out of the output profile O1 representing the correspondence relationship between the coordinate values in the CMYK color space depending on the printer 100A and the coordinate values in the CIELAB color space and the output profile O2 representing the correspondence relationship between the coordinate values in the CMYK color space depending on the printer 100B and the coordinate values in the CIELAB color space based on the coordinate values in the difference area Gd between the color gamut G1 in the CIELAB color space which can be expressed by the printer 100A and the color gamut G2 in the CIELAB color space which can be expressed by the printer 100B. By referring to the color samples prepared by the color expression apparatus capable of expressing the colors corresponding to the color sample data based on the color sample data, the color gamut in which one of the printers 100 can express the colors but the other of the printers 100 cannot express the colors is found out, and therefore, it becomes possible to easily judge whether or not the desired color can be expressed.

Further, the method of generating the color sample data according to the present embodiment includes the output profile acquisition step of obtaining the output profile O1 and the output profile O2, and the difference area derivation step of obtaining the color gamut G1 with the output profile O1 and obtaining the color gamut G2 with the output profile O2 to obtain the difference area Gd based on the color gamut G1 and the color gamut G2 thus obtained. Further, the method of generating the color sample data according to the present embodiment includes the color sample data generation step of generating the color sample data for preparing the color samples of the colors included in the difference area Gd using the output profile capable of expressing the colors corresponding to one of the printer 100A and the printer 100B which can express the colors in at least a part of the difference area Gd out of the output profile O1 and the output profile O2 based on the coordinate values in the difference area Gd.

It is possible to obtain the difference area Gd between the color gamuts which can be expressed by the respective color expression apparatuses in the CIELAB color space based on the output profile O1 and the output profile O2 thus obtained. The color sample data for preparing the color samples of the colors included in the difference area Gd is generated using the output profile capable of expressing the colors corresponding to one of the printer 100A and the printer 100B which can express the colors in at least a part of the difference area Gd out of the output profile O1 and the output profile O2 based on the coordinate values in the difference area Gd. By referring to the color samples prepared by the color expression apparatus capable of expressing the colors corresponding to the color sample data based on the color sample data, the color gamut in which one of the printers 100 can express the colors but the other of the printers 100 cannot express the colors is found out, and therefore, it becomes possible to easily judge whether or not the desired color can be expressed.

Further, the method of generating the color sample data according to the present embodiment includes the sampling specification setting step of setting the sampling specification of the coordinate in the difference area Gd to be the target for the generation of the color sample data, and the color sample coordinate derivation step of deriving the coordinates of the color sample data to be the target for the generation in the color sample data generation step based on the coordinates in the difference area Gd and the sampling specification thus set.

Therefore, the color samples prepared based on the color sample data thus generated are not limited to the color samples of the coordinates handled in the difference area derivation step. For example, by increasing the sampling intervals to decrease the number of the coordinates for generating the color sample data, or conversely, by increasing the coordinates for generating the color sample data by adding the midpoints between the coordinates handled in the difference area derivation step, namely the midpoints between the grid points, the centroids of the hexahedrons having the eight grid points adjacent to each other as the vertexes, and so on, it becomes possible to generate the color sample data corresponding to these coordinates. As a result, it becomes possible to make the color difference between the color samples clearer, or to prepare a larger number of color samples smaller in color difference between the color samples.

Further, in the method of generating the color sample data according to the present embodiment, a predetermined color difference in the CIELAB color space is set as the sampling specification in the sampling specification setting step, and in the color sample coordinate derivation step, it is possible to set the coordinates having the shortest distance from the coordinate in the common area to the color gamut G1 and the color gamut G2 which is no shorter than the predetermined color difference out of the coordinates in the difference area Gd as the coordinates of the color sample data to be the target for the generation in the color sample data generation step. In this case, the color samples prepared based on the color sample data thus generated become the color samples having the color difference having a distance no shorter than at least the predetermined color difference from the colors in the common area which can be expressed with both of the color gamut G1 and the color gamut G2. As a result, it becomes easy to visually recognize the fact that the colors in the difference area Gd are the colors obviously different from the colors in the common area, and therefore, it becomes possible to easily judge whether or not the colors in the difference area Gd can be used as the desired colors.

Further, in the method of generating the color sample data according to the present embodiment, in the sampling specification setting step, it is possible to designate the attribute information of the existing color sample as the sampling specification, and in the color sample coordinate derivation step, it is possible to set the coordinates corresponding to the existing color samples included in the difference area Gd as the coordinates of the color sample data to be the target for the generation in the color sample data generation step. In this case, by referring to the color samples prepared based on the color sample data thus generated, it becomes possible to easily judge, for example, whether or not existing general color samples can be used as the desired colors, and when the existing general color samples can be used, it is possible to easily designate the colors based on the existing general color samples as the desired colors.

Further, the method of preparing the color sample according to the present embodiment includes the step of generating the color sample data using the method of generating the color sample data described above, and the step of preparing the color sample using the color sample data thus generated. Therefore, it is possible to obtain the color samples with which it is possible to easily judge whether or not the desired color can be expressed.

Further, the color sample preparation device 1 according to the present embodiment is provided with the image processing device 110 for generating the color sample data using the method of generating the color sample data described above, and the printer 100 for preparing the color sample using the color sample data thus generated. Therefore, it is possible to prepare the color samples with which it is possible to easily judge whether or not the desired color can be expressed.

It should be noted that although in the present embodiment, the description is presented assuming that the printer 100 is the inkjet printer taking the print medium 5 having the elongated shape supplied in the rolled state as the printing target, the print medium is not limited to the print medium 5 shaped like a roll, and can also be sheet-like cut paper or the like. In the case of a sheet-like form, there is adopted a configuration in which, for example, a supply mechanism including a separator for supplying the form one by one is provided instead of the supply section 51, and there is adopted a configuration in which, for example, a storage tray for storing the forms discharged after printing is provided instead of the housing section 52.

Further, although the color expression apparatus is described citing the inkjet printer as an example, the color expression apparatus is not limited to such a printer, but can also be a projector, a monitor, or the like. In this case, the color sample is a color sample image to be projected by the projector, or a color sample image to be displayed on the monitor screen.

2. Embodiment 2

In Embodiment 1, there is described the generation of the color sample data for matching the colors to be reproduced between the printers 100 different from each other, and for judging whether or not printing with the desired colors can be achieved by the printer 100 to be used citing when the color reproduction range in which the printer 100 can express the colors is different by the specification of the printer 100 as an example. The color reproduction range in which the colors can be expressed is different not only by such a difference in the color expression apparatus, but also by a difference in the input image color space. For example, when comparing the sRGB color space and the Adobe (a registered trademark) RGB color space with each other, the AdobeRGB color space is broader than the sRGB color space. In other words, the source gamut GMS corresponding to the sRGB color space in the CIELAB color space shown in FIG. 5 is included in the internal area of the source gamut GMS corresponding to the AdobeRGB color space. Therefore, for example, when the printer gamut GMP constitutes a color space including the source gamut GMS corresponding to the AdobeRGB color space, in other words, when the printer 100 can express all of the colors in the AdobeRGB color space, the range of the colors expressed by the printer 100 is narrowed by changing the input image color space from the AdobeRGB color space to the sRGB color space.

In contrast, the method of generating the color sample data according to the present embodiment is characterized in that the color sample data for preparing the color sample of the color included in the difference area is generated using the output profile capable of expressing the colors and representing the correspondence relationship between the coordinate values in the CMYK color space depending on the printer 100 capable of expressing the colors in at least a part of the difference area and the coordinate values in the CIELAB color space based on the coordinate values in the difference area between the first color gamut in the CIELAB color space corresponding to a first input image color space and the second color gamut in the CIELAB color space corresponding to a second input image color space out of a plurality of input image color spaces such as the sRGB color space or the AdobeRGB color space.

A specific description will hereinafter be presented with reference to the flowcharts shown in FIG. 11 and FIG. 12. It should be noted that the same constituents as in Embodiment 1 are denoted by the same reference symbols, and the redundant description will be omitted.

Figure 11:
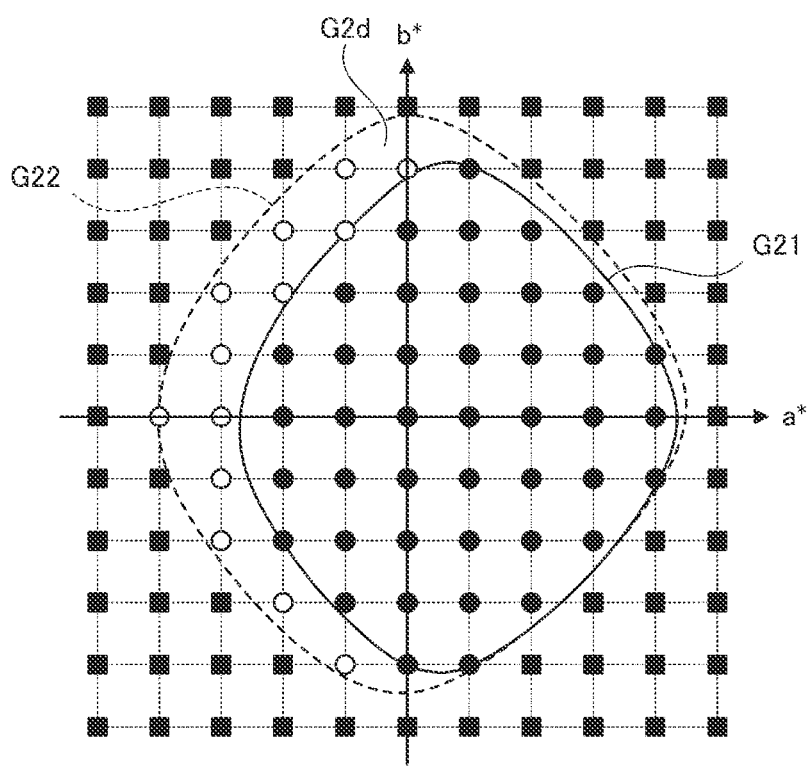
FIG. 11 is a coordinate conceptual diagram showing a relationship in color gamut in the CIELAB color space.
Figure 12:
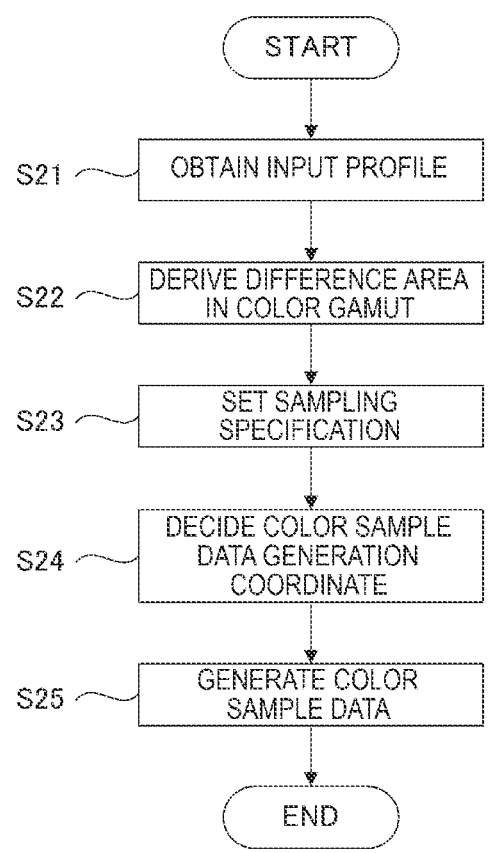
FIG. 12 is a flowchart showing a method of generating color sample data according to Embodiment 2.

Similarly to FIG. 7, FIG. 11 shows an a*b* plane at a certain lightness L* in the CIELAB color space. In FIG. 11, a color gamut G21 represents the first color gamut in the CIELAB color space which can be expressed by the printer 100 when the input image color space is the first input image color space, and a color gamut G22 represents the second color gamut in the CIELAB color space which can be expressed by the printer 100 when the input image color space is the second input image color space. It should be noted that it is assumed that the color gamut which can be reproduced by the printer 100 as the specification of the printer 100 is the color gamut including the color gamut G22.

Further, in FIG. 11, the coordinates represented by the filled circles each represent the coordinate included in the color gamut G21, the coordinates represented by the filled quadrangles each represent the coordinate included in neither the color gamut G21 nor the color gamut G22, and the coordinates represented by the open circles each represent the coordinate included in the difference area G2d between the color gamut G21 and the color gamut G22. It should be noted that FIG. 11 shows an example of when the color gamut G21 is included inside the color gamut G22.

Further, a first input profile representing a correspondence relationship between the coordinate values in the first input image color space and the coordinate values in the CIELAB color space is defined as an input profile I1, and a second input profile representing a correspondence relationship between the coordinate values in the second input image color space and the coordinate values in the CIELAB color space is defined as an input profile I2.

As the method of generating the color sample data according to the present embodiment, first, the input profile I1 and the input profile I2 are obtained as the step S21. The step S21 is an input profile acquisition step in the present embodiment.

The input profile I1 and the input profile I2 can be obtained in advance, and for example, all of the input profiles which the printing system 1000 can deal with are stored in advance in the storage section 114 provided to the image processing device 110. In the step S21, in order to obtain the difference area G2d between the first input image color space and the second input image color space, the input profile I1 and the input profile I2 stored in the storage section 114 are retrieved.

Then, as the step S22, the color gamut G21 is obtained by the input profile I1, the color gamut G22 is obtained by the input profile I2, and the difference area G2d is obtained based on the color gamut G21 and the color gamut G22 thus obtained. The step S22 is the difference area derivation step in the present embodiment.

In the step S22, specifically, the coordinate values included in the color gamut G21 and the color gamut G22 are recognized as the coordinate values on the common coordinate axis in the CIELAB color space, and then, the coordinates included in the difference area G2d are obtained based on the respective coordinate values thus recognized.

Then, as the step S23, there is set a sampling specification of the coordinate in the difference area G2d to be a target for the generation of the color sample data. The step S23 is the sampling specification setting step in the present embodiment, and is substantially the same as in the case of Embodiment 1.

Then, as the step S24, the coordinates to be the target for the generation of the color sample data are derived and then decided based on the sampling specification set in the step S23. The step S24 is the color sample coordinate derivation step in the present embodiment.

Then, as the step S25, the output profile of the printer 100 is obtained, and the color sample data corresponding to the coordinates to be the target for the generation of the color sample data decided in the step S24 is generated. The step S25 is the color sample data generation step in the present embodiment.

In the step S25, specifically, the color sample data as the print data on which the color conversion has been performed is generated using the output profile of the printer 100 based on the coordinate values of the target coordinates for the generation of the color sample data in the difference area G2d.

The print data generated here includes a command for forming the plurality of color samples corresponding respectively to the plurality of coordinates to be the target in the difference area G2d, namely the color chart having a plurality of color patches arranged.

According to the present embodiment, the following advantages can be obtained.

In the method of generating the color sample data according to the present embodiment, the color sample data for preparing the color samples of the colors included in the difference area G2d is generated using the output profile representing the correspondence relationship between the coordinate values in the CMYK color space depending on the color expression apparatus capable of expressing the colors in at least a part of the difference area G2d and the coordinate values in the CIELAB color space based on the coordinate values in the difference area G2d between the color gamut G21 in the CIELAB color space corresponding to the first input image color space and the color gamut G22 in the CIELAB color space corresponding to the second input image color space. By referring to the color samples prepared by the color expression apparatus capable of expressing the colors corresponding to the color sample data based on the color sample data, the color gamut which can be expressed in one of the input image color spaces, but cannot be expressed in the other of the input image color spaces is found out, and therefore, it becomes possible to easily judge whether or not the desired color can be expressed.

Further, the method of generating the color sample data according to the present embodiment includes the input profile acquisition step of obtaining the input profile I1 representing the correspondence relationship between the coordinate values in the first input image color space and the coordinate values in the CIELAB color space, and the input profile I2 representing the correspondence relationship between the coordinate values in the second input image color space and the coordinate values in the CIELAB color space, and the difference area derivation step of obtaining the color gamut G21 with the input profile I1, obtaining the color gamut G22 with the input profile I2, and obtaining the difference area G2d based on the color gamut G21 and the color gamut G22 thus obtained. Further, the method of generating the color sample data according to the present embodiment includes the color sample data generation step of generating the color sample data for preparing the color samples of the colors included in the difference area G2d using the output profile capable of expressing the colors and representing the correspondence relationship between the coordinate values in the CMYK color space depending on the color expression apparatus capable of expressing the colors in at least a part of the difference area G2d and the coordinate values in the CIELAB color space based on the coordinate values in the difference area G2d.

It is possible to obtain the difference area G2d between the color gamuts which can be expressed in the respective input image color spaces in the CIELAB color space based on the input profile I1 and the input profile I2 thus obtained. The color sample data for preparing the color samples of the colors included in the difference area G2d is generated using the output profile capable of expressing the colors and representing the correspondence relationship between the coordinate values in the CMYK color space depending on the color expression apparatus capable of expressing the colors in at least a part of the difference area G2d and the coordinate values in the CIELAB color space based on the coordinate values in the difference area G2d. By referring to the color samples prepared by the color expression apparatus capable of expressing the colors corresponding to the color sample data based on the color sample data, the color gamut which can be expressed in one of the input image color spaces, but cannot be expressed in the other of the input image color spaces is found out, and therefore, it becomes possible to easily judge whether or not the desired color can be expressed.

What is claimed is:

1. A method of generating color sample data comprising:
    generating the color sample data for preparing a color sample of a color included in a difference area between a first color gamut in an equipment independent color space which is expressed by a first color expression apparatus and a second color gamut in the equipment independent color space which is expressed by a second color expression apparatus using an output profile which expresses the color and corresponds to one of the first color expression apparatus and the second color expression apparatus configured to express a color in at least a part of the difference area out of a first output profile representing a correspondence relationship between a coordinate value in an output color space depending on the first color expression apparatus and a coordinate value in the equipment independent color space, and a second output profile representing a correspondence relationship between a coordinate value in an output color space depending on the second color expression apparatus and a coordinate value in the equipment independent color space based on a coordinate value in the difference area.

2. The method of generating the color sample data according to claim 1 further comprising:
    an output profile acquisition step of obtaining the first output profile and the second output profile;
    a difference area derivation step of obtaining the first color gamut with the first output profile, obtaining the second color gamut with the second output profile, and obtaining the difference area based on the first color gamut and the second color gamut obtained; and
    a color sample data generation step of generating the color sample data using the output profile which expresses the color based on the coordinate value in the difference area obtained.

3. The method of generating the color sample data according to claim 2 further comprising:
    a sampling specification setting step of setting a sampling specification of a coordinate in the difference area to be a target for the generation of the color sample data; and
    a color sample coordinate derivation step of deriving a coordinate of the color sample data to be a target for the generation in the color sample data generation step based on the coordinate in the difference area and the sampling specification set in the sampling specification setting step.

4. The method of generating the color sample data according to claim 3 wherein
    in the sampling specification setting step, a predetermined color difference in the equipment independent color space is set as the sampling specification, and
    in the color sample coordinate derivation step, a coordinate having a shortest distance from a coordinate in a common area to the first color gamut and the second color gamut which is no shorter than the predetermined color difference out of coordinates in the difference area is set as a coordinate of the color sample data to be a target for the generation in the color sample data generation step.

5. The method of generating the color sample data according to claim 3 wherein
    in the sampling specification setting step, attribute information of an existing color sample is designated as the sampling specification, and
    in the color sample coordinate derivation step, a coordinate corresponding to the existing color sample included in the difference area is set as the coordinate of the color sample data to be the target for the generation in the color sample data generation step.

6. A method of preparing a color sample comprising:
    generating the color sample data with the method of generating the color sample data according to claim 1; and
    preparing the color sample using the color sample data generated.

7. A color sample preparation device comprising:
    an image processing device configured to generate the color sample data with the method of generating the color sample data according to claim 1; and
    a printer configured to prepare the color sample using the color sample data generated.

8. A method of generating color sample data comprising:
generating the color sample data for preparing a color sample of a color included in a difference area between a first color gamut in an equipment independent color space corresponding to a first input image color space and a second color gamut in the equipment independent color space corresponding to a second input image color space using an output profile which expresses a color and represents a correspondence relationship between a coordinate value in an output color space depending on a color expression apparatus expressing a color in at least a part of the difference area and a coordinate value in the equipment independent color space based on a coordinate value in the difference area.

9. The method of generating the color sample data according to claim 8 further comprising:
an input profile acquisition step of obtaining a first input profile representing a correspondence relationship between a coordinate value in the first input image color space and a coordinate value in the equipment independent color space, and a second input profile representing a correspondence relationship between a coordinate value in the second input image color space and a coordinate value in the equipment independent color space;

a difference area derivation step of obtaining the first color gamut with the first input profile, obtaining the second color gamut with the second input profile, and obtaining the difference area based on the first color gamut and the second color gamut obtained; and a color sample data generation step of generating the color sample data using the output profile which expresses the color based on the coordinate value in the difference area obtained.

* * * * *